(No Model.) 2 Sheets—Sheet 1.
W. SANDERSON.
MACHINE FOR ASSEMBLING PARTS OF WHEELS.
No. 569,888. Patented Oct. 20, 1896.
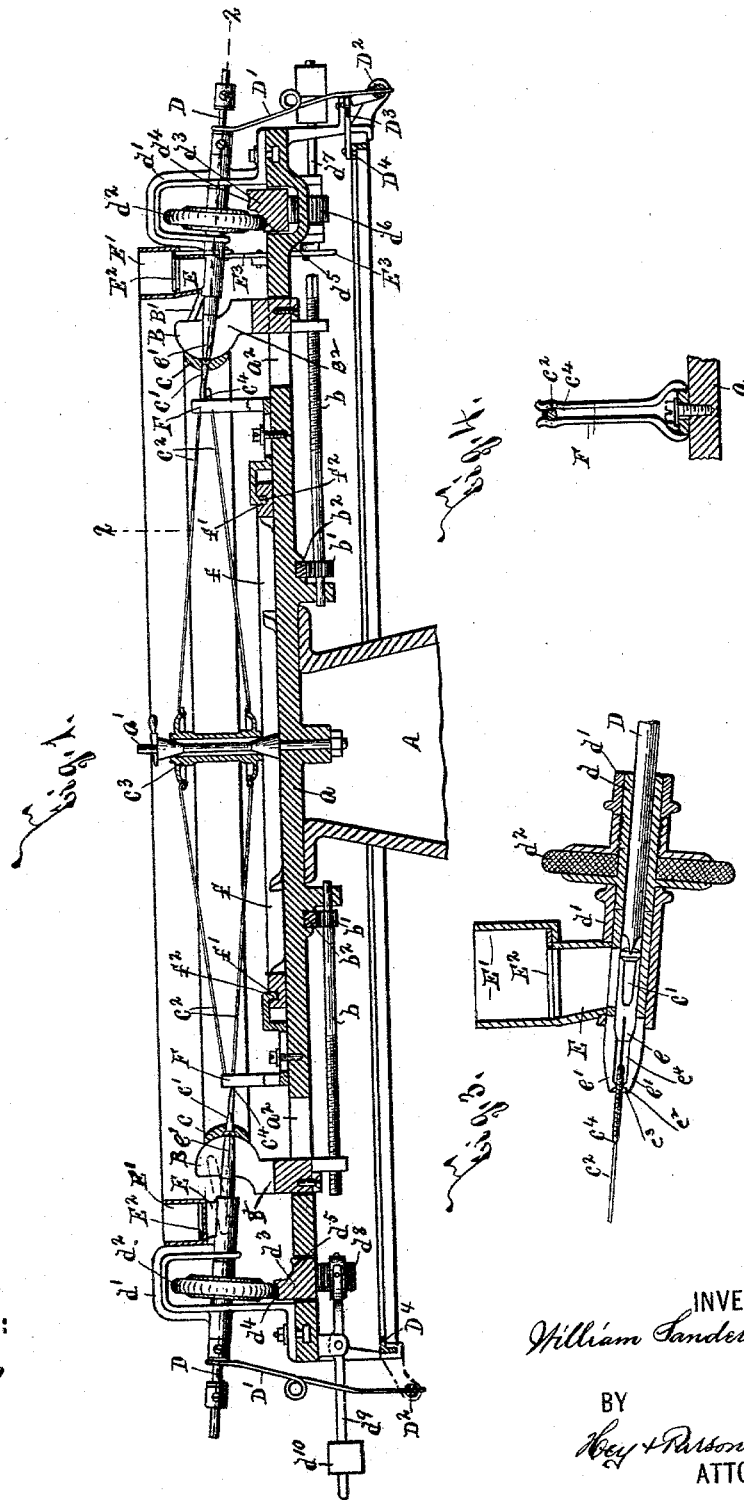
WITNESSES:
H. E. Chase,
F. F. Brewer.
INVENTOR
William Sanderson
BY
Hey & Parsons
ATTORNEYS.

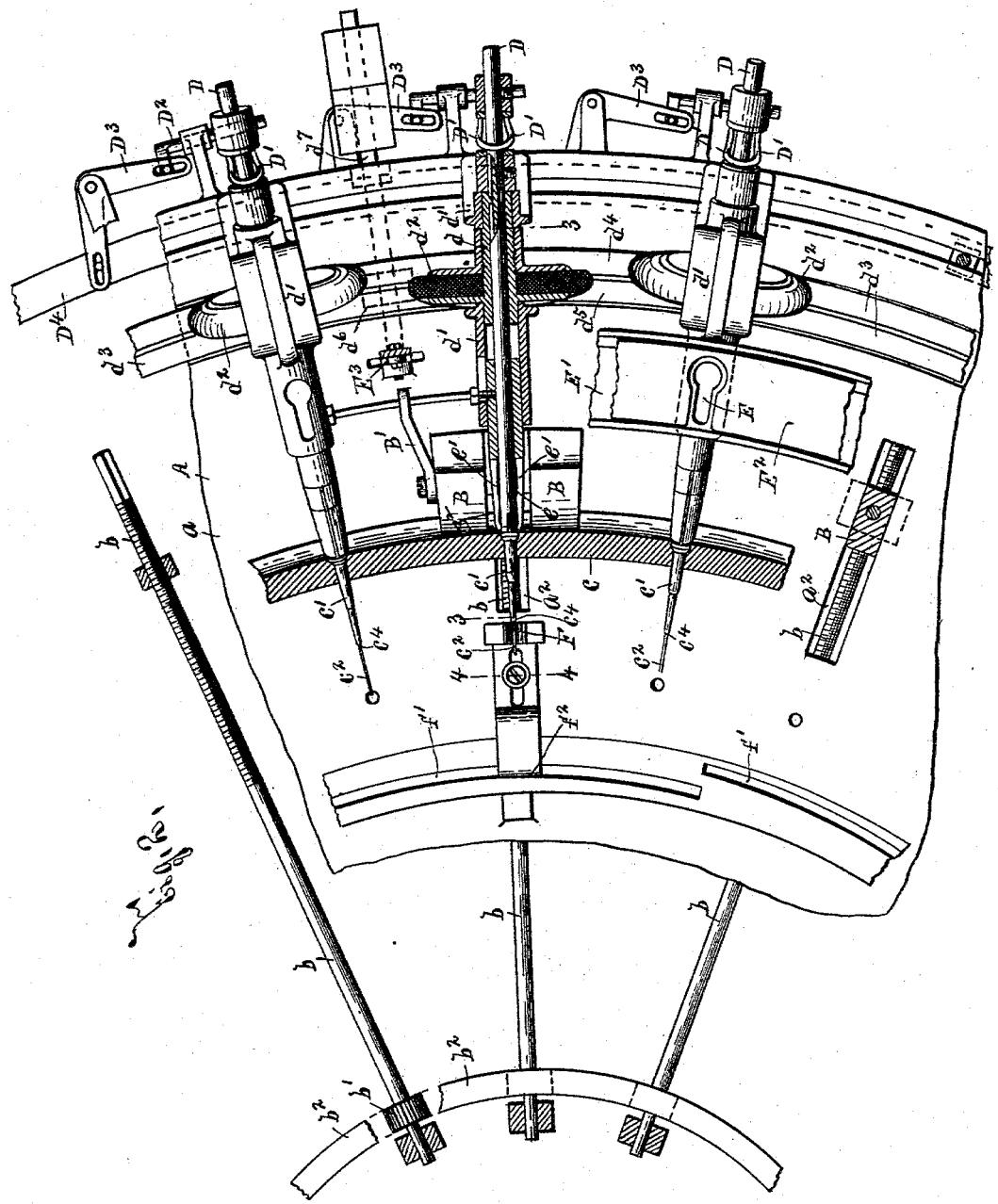

UNITED STATES PATENT OFFICE.

WILLIAM SANDERSON, OF SYRACUSE, NEW YORK, ASSIGNOR OF ONE-HALF TO HARVEY D. BURRILL, OF SAME PLACE.

MACHINE FOR ASSEMBLING PARTS OF WHEELS.

SPECIFICATION forming part of Letters Patent No. 569,888, dated October 20, 1896.

Application filed April 29, 1896. Serial No. 589,500. (No model.)

*To all whom it may concern:*

Be it known that I, WILLIAM SANDERSON, of Syracuse, in the county of Onondaga, in the State of New York, have invented new and useful Improvements in Machines for Assembling the Parts of Wheels, of which the following, taken in connection with the accompanying drawings, is a full, clear, and exact description.

My invention relates to improvements in machines for assembling the parts of wheels, and has for its object the production of a device for securing spoke-nipples to rims and to spokes with great rapidity and efficiency and for holding the rim true during such operation; and to this end it consists, essentially, in the general construction and arrangement of the component parts of said machine, all as hereinafter more particularly described, and pointed out in the claims.

In describing this invention reference is had to the accompanying drawings, forming a part of this specification, in which like letters indicate corresponding parts in all the views.

Figure 1 is a vertical section, partly in elevation, of my improved machine, a portion of a wheel being shown as operatively engaged thereby and only two of the operating pieces being illustrated. Fig. 2 is a horizontal section, partly in elevation, taken on line 2 2, Fig. 1; and Figs. 3 and 4 are vertical sections taken, respectively, on lines 3 3 and 4 4, Fig. 2.

A represents a supporting-frame, B clutch-dogs for engaging the rim $c$ of a vehicle-wheel, D operating-pieces for simultaneously securing interiorly-threaded spoke-nipples $c'$ within perforations in the rim $c$ and to the threaded ends of spokes $c^2$, and E guides for the nipples $c'$, all of which parts may be of any suitable form, size, and construction.

The frame A is formed with a top plate $a$, which supports the clutch-dogs B, and is provided with a spindle $a'$ for entering the wheel-hub $c^3$. The clutch-dogs B are usually provided with slots $B^2$, extending downwardly from their upper edges, and convex inner faces for engaging the outer peripheral face of the rim $c$, and are preferably connected by any suitable mechanism for moving them all simultaneously. The outer peripheral face of the rim $c$ is preferably formed concave in cross-section, and consequently the convex inner faces of the clutch-dog hold said rim true edgewise, or, in other words, prevent lateral deflection thereof. I have here shown said clutch-dogs as movable in slots $a^2$ in the plate $a$ and as engaged with screw-threaded rods $b$, having their inner ends provided with pinions $b'$, which mesh with a circular rack $b^2$, movable in a guide on the lower face of the plate $a$.

A vehicle-wheel is usually provided with upper and lower series of spokes inclined toward each other from the hub, to which their inner ends are secured, and consequently the operating-pieces D for attaching nipples to said spokes incline at an angle with each other in planes substantially coincident with the planes of said spokes. The operating-pieces D are reciprocally movable through sleeves $d$, to which they are suitably keyed, as best seen at Fig. 2, and are revolved with said sleeves by any suitable mechanism for permitting one or more of the operating-pieces to cease revoluble movement when the corresponding nipples are forced to the desired position.

The operating-pieces D are preferably moved endwise independently by suitable springs $D'$, which are adapted to engage the adjacent faces of separate collars on said operating-pieces and are secured to movable supports $D^2$, rocked to and fro by pivoted levers $D^3$. A suitable rocking ring or part $D^4$ is connected to the levers $D^3$ and simultaneously operates the same for rocking the supports $D^2$. The sleeves $d$ are supported by brackets $d'$, detachably mounted on the supporting-frame, and are formed with separated bearings or sockets for receiving the opposite ends of said sleeves, and wheels $d^2$ are interposed between said bearings or sockets and are fixed to said sleeves for revolving the same and the operating-pieces D. A driving or friction wheel or disk $d^3$ is arranged beneath the wheels $d^2$, and is provided with circular engaging faces $d^4 d^5$, arranged out of alinement with each other for frictionally engaging the wheels arranged on the separated series of the operating-pieces D. The wheel or disk $d^3$ may be driven by any suitable means, and is preferably provided with gear-teeth on its under face engaged with a pinion $d^6$, mounted on a shaft $d^7$, to which power may be applied by any suitable driving mechanism.

The friction between the wheels $d^2$ and the wheel or disk $d^3$ is insufficient to rotate the operating-pieces when the corresponding spoke-nipples are in the desired position, and consequently one or more of said operating-pieces will cease to revolve should the corresponding spoke-nipples be forced to the desired position prior to the cessation of the operation of the remaining operating-pieces. It is frequently advisable to vary the friction between the wheels $d^2$ and the wheel or disk $d^3$, and consequently one or more idlers $d^8$ are engaged with the teeth on the under surface of the wheel or disk $d^3$, and are supported by movable levers $d^9$, provided with adjustable weights $d^{10}$.

The operating-pieces D are movable through guides $e$, which are connected to the guides E for feeding the spoke-nipples. The outer ends of the guides $e$ are arranged in sockets in the inner sides of the brackets $d'$, and their ends are arranged in the slots $B^2$ in the clutch-dogs B in alinement with the convex faces of said clutch-dogs. The guides $e$ are usually moved to and fro with said clutch-dogs by connections B', having their inner ends secured to the clutch-dogs and their outer ends secured to tie-pieces connecting each pair of the guides $e$. The guides $e$ are provided with spring-jaws $e'$ for receiving and engaging the threaded ends of the spokes $c^2$ and for alining the spoke-nipple with said guides. The inner faces of the jaws $e'$ are formed with projecting shoulders $e^2$ for engaging and holding the outer ends of spokes, and said jaws are provided at their extremities with outwardly-flaring end faces $e^3$ for guiding the outer extremities of the spokes and inclose chambers $e^4$, which extend inwardly from the shoulders $e^2$, are formed of greater diameter than the outer extremities of the spokes, and encircle said extremities for guiding the nipples $c'$ thereto.

The guides E are connected to any suitable means for continuously feeding the spoke-nipples, as a hopper E', provided with a suitable agitator $E^2$ in its base, formed with cut-outs for receiving the spoke-nipples and alining the same with the upper ends of the guides $e$. The agitator $E^2$ is rocked to and fro by any suitable means, as a lever $E^3$, connected to said agitator and to the shaft $d^7$.

The hopper E', the agitator $E^2$, and the means for actuating said agitator have been but briefly described, since their specific construction and arrangement form no part of my present invention and will be readily apparent to those skilled in the art.

When the operating-pieces are withdrawn from their normal position, the spoke-nipples feed from the guides E into the guides $e$, with their enlarged ends adjacent to the inner ends of said operating-pieces, which are suitably formed for entering slots in the enlarged ends of said nipples. As the operating-pieces are reciprocated toward the wheel-rim the spoke-nipples are suitably engaged thereby and are forced inwardly into alinement with the threaded ends of the spokes. The revoluble movement of the operating-pieces then secures the nipples upon the spokes until they are sufficiently inserted within the apertures in the wheel-rim. During the securement of the spoke-nipples the spokes $c^2$ are held by suitable clamps F, which preferably reciprocate along the plate $a$, and are provided with upwardly-projecting substantially parallel spring-arms. The upper ends of said spring-arms are arranged on opposite sides of the outer ends of the spokes and the outer faces of said ends of the spring-arms are engaged with shoulders $c^4$, formed on the outer ends of the spokes. The clamps F operate to prevent bending of the spokes, and preferably tension said spokes before the securement of the spoke-nipples, and to effect this result are usually movable radially by any suitable means, here illustrated as a rocking hand-ring $f$, mounted on the plate $a$ and provided with cam-slots $f'$, engaged with shoulders $f^2$ on the base of said clamps.

In the operation of my invention the wheel is mounted on the spindle $a'$, and is quickly engaged by the clutch-dogs B, which hold the same firm and true. The spoke-nipples are fed into the guides $e$, and the operating-pieces D are then moved endwise and are frictionally revolved for securing the spoke-nipples in position. It will be readily apparent, however, that my invention, instead of securing interiorly-threaded spoke-nipples simultaneously to a wheel-rim and to threaded spokes, may be used for securing nipples to the outer ends of spokes before said spokes are secured to a rim, or may be used for securing exteriorly-threaded spoke-nipples to a wheel-rim or for boring holes in the rim, providing augers are used as operating-pieces instead of screw-drivers.

The operation of my invention will now be readily understood upon reference to the foregoing description and the accompanying drawings.

Having thus fully described my invention, what I claim as new, and desire to secure by Letters Patent, is—

1. In a machine for assembling the parts of wheels, the combination of a reciprocating operating-piece for securing the spoke-nipples in position, a wheel for revolving the operating-piece, a second wheel for engaging and driving the former wheel, and a rocking actuating part for forcing the operating-piece endwise through said wheel into and out of operative position, said rocking piece having its axis arranged substantially coincident with the axis of the second wheel, substantially as and for the purpose specified.

2. In a machine for assembling the parts of wheels, the combination of a reciprocating operating-piece, a wheel for revolving the operating-piece, a spring for moving the operating-piece endwise through said wheel, a second wheel for engaging and driving the first wheel having its axis arranged at substantially right angles with the axis of the first wheel, a movable support for the spring, and a rocking actuating part connected to said support and having its axis arranged substantially coincident with the axis of the second wheel, substantially as and for the purpose set forth.

3. In a machine for assembling the parts of wheels, the combination of a driving-wheel, an operating-piece reciprocating crosswise of the driving-wheel and arranged at an incline with the axis of said wheel, means for revolving the operating-piece, and an actuating part connected to the operating-piece for reciprocating the same, substantially as and for the purpose described.

4. In a machine for assembling the parts of wheels, the combination of a reciprocating operating-piece, means for frictionally revolving the operating-piece, a rocking part connected to the operating-piece for reciprocating the same, and a spring interposed between the operating-piece and the rocking part, substantially as and for the purpose specified.

5. In a machine for assembling the parts of wheels, the combination of operating-pieces for securing the spoke-nipples in position, means for simultaneously rotating the operating-pieces, and means for moving the operating-pieces endwise independently toward the spoke-nipples, substantially as and for the purpose set forth.

6. In a machine for assembling the parts of wheels, the combination of a substantially horizontal driving-wheel, operating-pieces arranged above the driving-wheel and reciprocating crosswise of the same and arranged at an angle less than a right angle with the axle of said wheel, additional wheels mounted on the operating-pieces and frictionally engaged with the driving-wheel for frictionally revolving the operating-pieces independently, and means for moving the operating-pieces endwise independently through the additional wheels toward their operative positions, substantially as and for the purpose described.

7. In a machine for assembling the parts of wheels, the combination of a substantially horizontal driving-wheel, a series of operating-pieces arranged above the driving-wheel and reciprocating crosswise of the same, a second series of operating-pieces arranged above the driving-wheel and reciprocating crosswise of the same in a plane arranged at an angle with the plane in which the former operating-pieces are reciprocally movable, additional wheels mounted on the operating-pieces and simultaneously rotated by the driving-wheel, and means for independently reciprocating the operating-pieces through the additional wheels, substantially as and for the purpose specified.

8. In a machine for assembling the parts of wheels, the combination of a series of operating-pieces, a second series of operating-pieces arranged at an angle with the former operating-pieces, wheels for independently revolving the operating-pieces of each series, and a disk having faces arranged out of alinement with each other for frictionally engaging and rotating the wheels and thereby revolving each series of the operating-pieces, substantially as and for the purpose specified.

9. In a machine for assembling the parts of wheels, the combination of a driving-wheel, operating-pieces reciprocating crosswise of the driving-wheel, additional wheels frictionally engaged with the driving-wheel for independently revolving the operating-pieces, a roller for adjustably forcing the first wheel toward the additional wheels, and means for holding the roller in its adjusted position, substantially as and for the purpose set forth.

10. In a machine for assembling the parts of wheels, the combination of a guide for the spokes and the nipples, provided with inner projecting shoulders for engaging the outer extremities of the spokes, and a chamber extending inwardly from the shoulders, said chamber being formed of greater diameter than the outer extremities of the spokes, and encircling said extremities for guiding the nipples thereto, a reciprocating operating-piece for securing the nipples in position, and means for automatically revolving the operating-piece, substantially as and for the purpose described.

11. In a machine for assembling the parts of wheels, the combination of guides for the spokes and the nipples, provided with inner projecting shoulders for engaging the outer extremities of the spokes, and a chamber extending inwardly from the shoulders, said chamber being formed of greater diameter than the outer extremities of the spokes, and encircling said extremities for guiding the nipples thereto, operating-pieces for securing the nipples to the spokes, means for actuating the operating-pieces, and clamps for engaging the spokes and preventing bending thereof, substantially as and for the purpose specified.

12. In a machine for assembling the parts of wheels, the combination of guides for receiving the spokes and the nipples, operating-pieces for securing the nipples to the spokes, means for actuating the operating-pieces, clamps for engaging the spokes and preventing bending thereof, said clamps being provided with spring-arms having their upper ends arranged on opposite sides of the outer ends of the spokes and the outer faces of said ends of the arms being engaged with shoulders formed upon the spokes, and means for reciprocating said clamps, substantially as and for the purpose set forth.

13. In a machine for assembling the parts of wheels, the combination of movable clutch-dogs for engaging the rim and holding the same true, said clutch-dogs being provided with slots extending therethrough, means for actuating the clutch-dogs, operating-pieces movable through the slots for securing the nipples to the rim, and means for revolving the operating-pieces, independently, substantially as and for the purpose specified.

14. In a machine for assembling the parts of wheels, a supporting-frame, a supporting-bracket detachably mounted on the frame and formed with separated bearings or sockets, a driving-wheel supported by said frame, a sleeve having its opposite ends journaled in the bearings or sockets, and a wheel arranged between said bearings or sockets and fixed to the sleeve, said wheel being engaged with the former wheel, and an operating-piece revoluble with said sleeve and reciprocating therethrough, substantially as and for the purpose set forth.

15. In a machine for assembling the parts of wheels, a supporting-bracket provided with a bearing or socket, a sleeve having one end journaled in the bearing or socket and provided with a wheel for revolving the same, a guide for the spoke-nipples, and a second guide for receiving the spoke-nipples from the first guide having one end arranged in said bearing or socket in alinement with the sleeve, an operating-piece reciprocally movable through the sleeve and the second guide, and means for revolving the operating-piece, substantially as and for the purpose specified.

16. In a machine for assembling the parts of wheels, the combination of clutch-dogs movable toward and away from the outer peripheral face of the rim for holding said rim, guides for the nipples connected to said dogs and movable simultaneously therewith, and operating-pieces movable in the guides for securing the nipples to the rim, substantially as described.

17. In a machine for assembling the parts of wheels, the combination of clutch-dogs having upright convex engaging faces movable toward and away from the outer peripheral face of the rim for holding the rim and preventing lateral deflection thereof, a driving-wheel, operating-pieces for securing the nipples to the rim reciprocating crosswise of the driving-wheel, additional wheels mounted on the operating-pieces and engaged with the driving-wheel for revolving the operating-pieces, and means for moving the operating-pieces endwise independently through the additional wheels, substantially as and for the purpose set forth.

In testimony whereof I have hereunto signed my name, in the presence of two attesting witnesses, at Syracuse, in the county of Onondaga, in the State of New York, this 25th day of April, 1896.

WILLIAM SANDERSON.

Witnesses:
ARTHUR E. PARSONS,
E. A. WEISBURG.